UNITED STATES PATENT OFFICE.

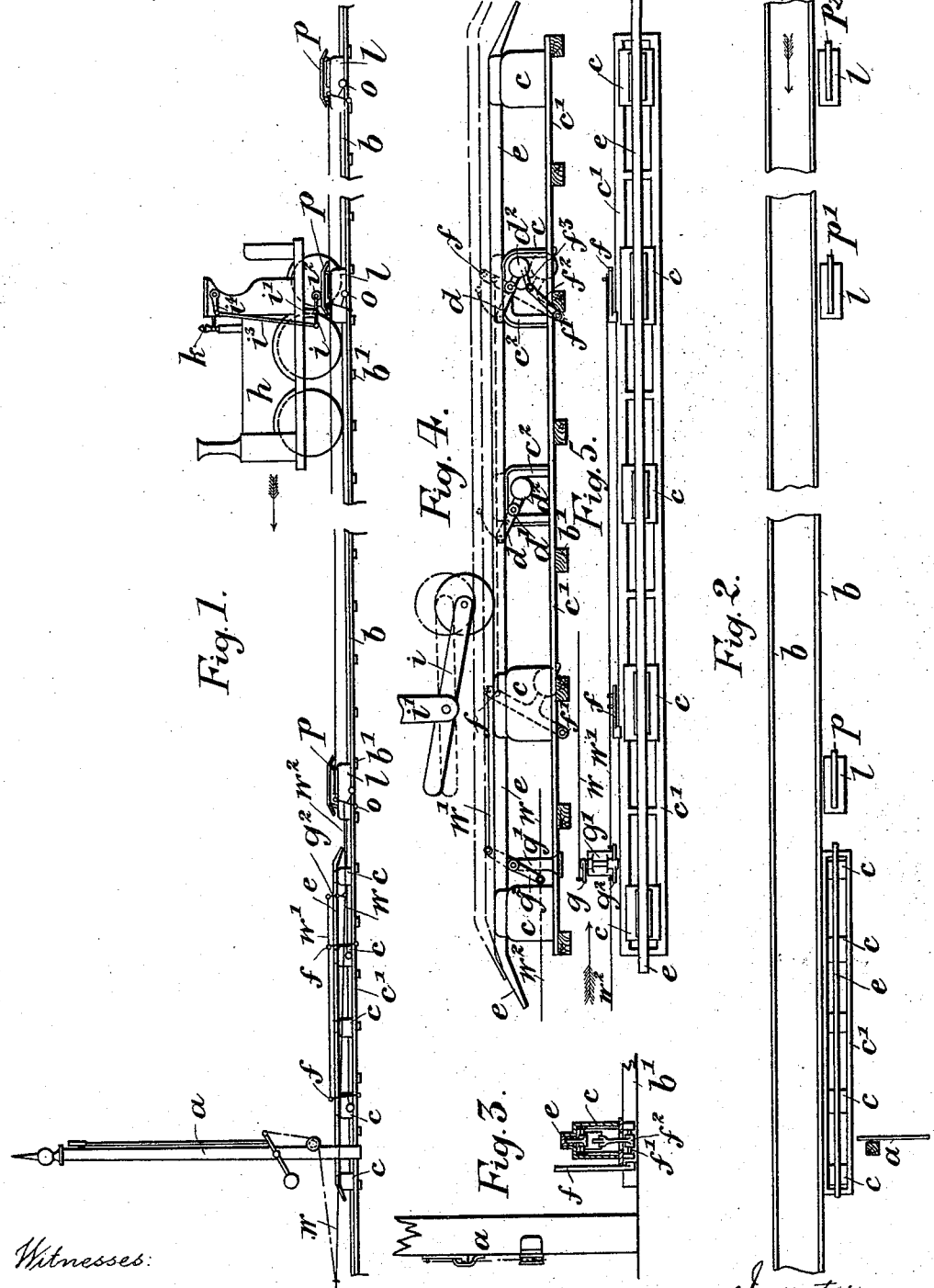

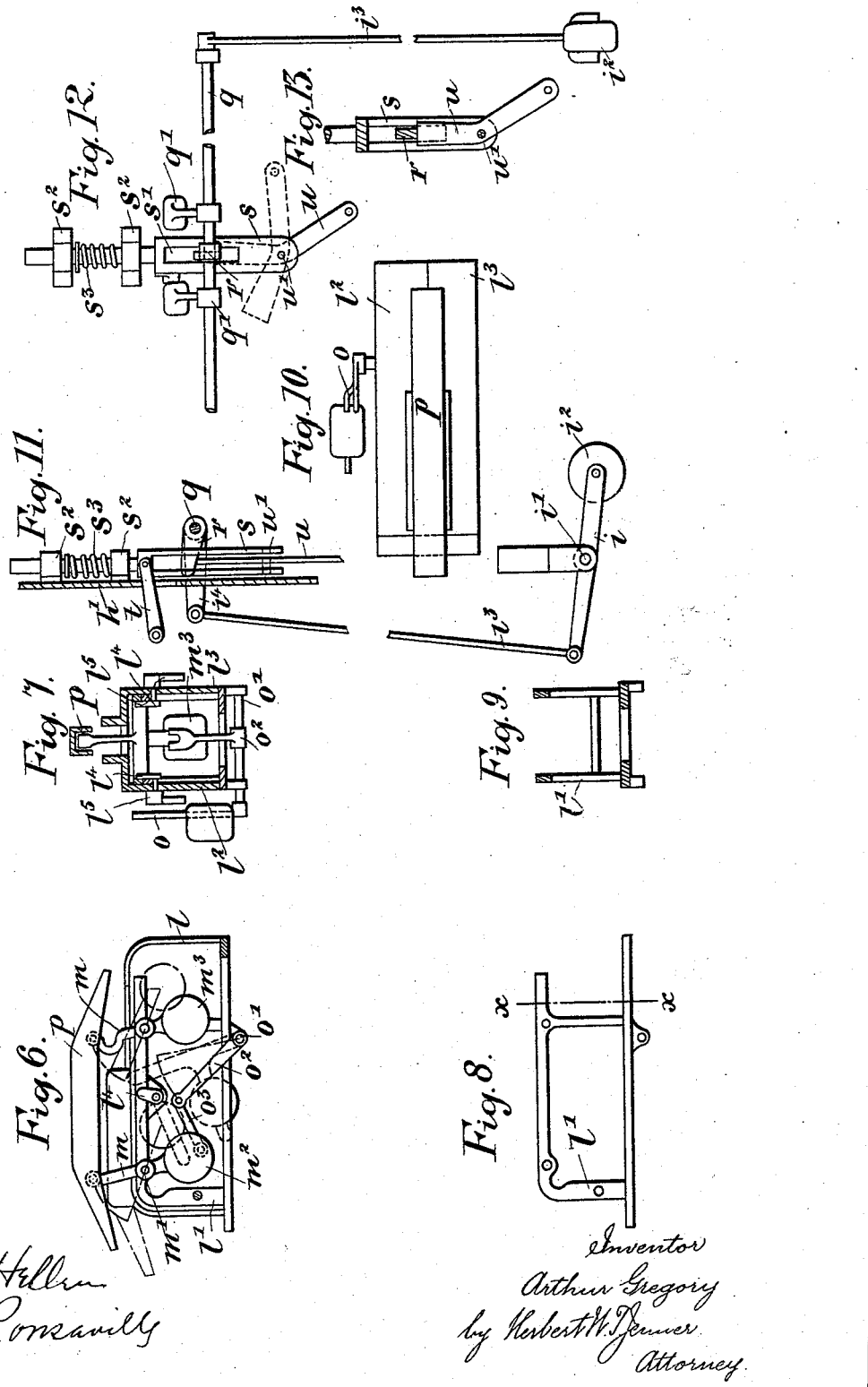

ARTHUR GREGORY, OF LONDON, ENGLAND.

RAILWAY SIGNALING.

SPECIFICATION forming part of Letters Patent No. 536,335, dated March 26, 1895.

Application filed October 29, 1894. Serial No. 527,137. (No model.) Patented in England July 6, 1894, No. 13,133.

*To all whom it may concern:*

Be it known that I, ARTHUR GREGORY, a subject of the Queen of Great Britain and Ireland, residing at 67 Appian Road, Old Ford, London, England, have invented certain new and useful Improvements in Railway Signaling, (patented in Great Britain July 6, 1894, No. 13,133;) and I do declare the following to be a full, clear, and exact description of the invention, such as will enable others skilled in the art to which it appertains to make and use the same.

This invention relates to improvements in railway signaling apparatus of the kind wherein a horizontal bar is raised or lowered so as to act upon a pivoted roller carried by the locomotive, thereby causing an audible signal to be sounded, and has for its object to dispense with the ordinary fog-signals and to actuate the signals in a more efficient and reliable manner. For this purpose I fix upon one side of the line, contiguous to the signal post, a series of boxes containing frames to which are pivoted counterweighted levers connected at their outer ends to a long horizontal bar or bearing rail, upon which travels a roller carried by a lever pivoted to each side of the locomotive, when the said bar is raised by means of outside levers and chains or wires actuated from the signal-box. The roller levers are connected by rods and arms to a horizontal shaft supported in bearings across the front plate of the cab or shelter of the locomotive, and this shaft carries an arm whose free end enters a slot formed in a vertical slide connected by a lever to the whistle, so as to cause the latter to sound when the vertical slide is drawn down. The lower end of the slide carries a pivoted lever one arm of which bears against the lower edge of the arm carried by the shaft so that when the latter is operated it causes the arm to force down the pivoted lever and consequently the slide. As long as the slide is down the whistle is sounding but should it be desired to stop the whistle, the pivoted lever is turned on its axis so as to free it from the aforesaid arm thus permitting the slide to rise by means of a spring attached thereto, and shutting off steam from the whistle. I also fix three separate boxes containing frames to the side of the line, one close to the long horizontal bar, the second about fifty yards in front of the first and the third about ten yards in front of the second. To the fixed frames of these boxes are pivoted counter balanced levers connected to a short horizontal bar which latter is operated in a similar manner to the long horizontal bar but in their normal or "danger" position they are raised while the latter is in its lowest position.

Referring to the accompanying two sheets of drawings, Figure 1 is a diagrammatic view in side elevation of my improved signaling apparatus, and Fig. 2 is a plan thereof. Figs. 3, 4, and 5 are respectively an end view partly in section, a side elevation and a plan of my improved apparatus for operating the long horizontal bar. Fig. 6 is a side elevation and Fig. 7 a cross section showing the mechanism for operating one of the short horizontal bars. Fig. 8 is a side view of the fixed frame of the box containing said mechanism. Fig. 9 is a cross section thereof on line $x\,x$ of Fig. 8, and Fig. 10 is a plan of the said box. Figs. 11, 12 and 13 are detail views showing the whistle operating mechanism.

$a$ is an ordinary signal post and $b$ the line or permanent way.

$c$ is a series of boxes supported by the plate or frame $c'$ and containing fixed frames $c^2$, the frame $c'$ being secured to the sleepers $b'$ on the side of the line and contiguous to the signal post $a$. The levers $d$ are pivoted at $d'$ to the fixed frames $c^2$ which form the upper part of the frame $c'$ and are provided with counterweights $d^2$ as shown in Fig. 4 in which one side of two of the boxes is removed.

The levers $d$ are each pivoted at their outer ends to the long horizontal bar $e$ and they are operated by means of the counterbalanced levers $f$ from the signal box, the mechanism for effecting which is carried in two of the boxes $c$ made larger for this purpose as shown. The levers $f$ are each fixed to a shaft $f'$ which actuates a lever $f^2$ connected by a short arm or link $f^3$ to the counterweight $d^2$, the said levers, wires, &c., being to the outside of the line so as to be clear of the trains.

The signal wire $w$ is connected to the lever $g$ pivoted to the bracket $g'$ and this lever actuates the double armed lever $g^2$ the upper arm of which is connected by the wire $w'$ to the levers $f$.

The locomotive $h$ is provided with two levers $i$ pivoted one on each side thereof at $i'$ to the frame and each carrying a roller $i^2$. The other end of each lever is connected by a rod $i^3$ to a pivoted arm $i^4$ for actuating the whistle $k$.

The mechanism for actuating the short horizontal bars placed by the side of the line at various distances in advance of the long horizontal bar as shown in Figs. 6 and 7 consists of two levers $m$ pivoted at $m'$ to the fixed frame $l'$ of the box $l$ and provided with counterweights $m^2 m^3$. The counterbalanced levers $o$ actuate the mechanism in a similar manner to the lever $f$ being connected to a shaft $o'$ which actuates a lever $o^2$ attached to the counterweight $m^2$ by the link $o^3$, the lever $o$ being connected to the lower end of the lever $g^2$ by the wire $w^2$. The upper ends of the levers $m$ are pivoted to the short horizontal bars $p$ to raise or lower them as required.

The box $l$ is constructed in a similar manner to the boxes $c$, viz: being composed of removable sides $l$ and $l^3$, the latter being fixed by means of tongues or catches $l^4$ bearing against the inside of the frames $l'$ and turned by handles $l^5$, the said sides forming a box or cover for protecting the mechanism from snow, dirt or the like. The mechanism for operating the whistle shown in Figs. 11 to 13 consists of a horizontal shaft $q$ carried in brackets $q'$ fixed to the front plate $h'$ of the locomotive cab. To the shaft $q$ is fixed an arm $r$ the free end of which enters the slot $s'$ formed in the vertical slide $s$ supported in bearings $s^2$ and provided with a spring $s^3$. The slide $s$ actuates the lever $t$ connected to the whistle and to the lower end thereof is pivoted at $q'$ a double armed lever $u$ the upper arm of which bears, in its operating position, against the lower edge of the arm $r$.

In the normal position of the apparatus—that is, when the signal is in its "danger" position, each of the short horizontal bars $p$ is in its raised position, as shown in Figs. 1, 6, and 7, in which position it is kept by the weights $m^2 m^3$ while the long horizontal bar $e$ is in its lowest position, being kept in such position by its own weight. If now a train comes along in the direction of the arrow Figs. 1 and 2 the roller $i^2$ will come into contact with and travel over the bar $p$ until the said roller leaves it, the bar being formed with an incline at each end for this purpose. The roller being thereby raised draws down the rod $i^3$ and actuates the shaft $q$ so as to depress the outer end of the arm $r$ which bearing upon the top of the lever $u$ pushes it and consequently the slide $s$ down, thus actuating the lever $t$ and causing the whistle to sound. As soon as the roller leaves the bar $p$ it reverses the mechanism permitting of the slide $s$ being raised by the spring $s^3$ and so allowing the steam to be cut off from the whistle. Upon a train approaching when the signal is at a danger position, the engine driver hearing two reports in quick succession caused by the two raised bars $p' p^2$ (Fig. 2) immediately slows down until reaching the raised bar $p$ when the whistle is again sounded, upon which he stops the train, the roller $i^2$ being at this time immediately over the long bar $e$ but as soon as the signal is lowered the said long bar is raised which action likewise raises the roller and so causes the whistle to sound. This is the signal for the driver to go on, the whistle continuing to sound until the roller has left the long bar $e$, or should the driver wish to cut short the whistle when traveling over the bar $e$ or disconnect it for any reason, he pulls the lever $u$ into the position shown in dotted lines in Fig. 12 thus permitting the slide $s$ to rise and shut off the whistle. The driver can then operate the whistle himself by pulling down the slide $s$.

If the signal should be in the "safety" or lowered position when the train arrives at the first bar $p^2$, the latter, as well as the two succeeding ones, being in their lowered position as shown in dotted lines in Fig. 6 the whistle will not be sounded and the driver knows he may proceed, but the long bar $e$ being in its raised position will cause a prolonged whistle to be sounded as the locomotive passes over it, thus indicating that the signal is in its "safety" or all-right position, and also telling the driver that he has passed the semaphore.

The counterweights $m^2, m^3$ are so arranged as to bring the parts into their "danger" or normal position should any of the signal wires or connections break.

Having now described my invention, what I claim as new, and desire to secure by Letters Patent, is—

1. In a railway signaling apparatus, the combination, with a normally depressed horizontal bar arranged longitudinally of the track in front of a signal post, of a series of normally raised horizontal bars arranged in front of the said long bar and operating to actuate an audible signal on an approaching engine, substantially as set forth.

2. In a railway signaling apparatus, the combination, with the long horizontal bar, and its stationary supports; of the weighted levers $d$ pivoted to the said bar and its supports, the pivoted weighted levers $f$ and $f^2$ operatively connected together and to the levers $d$, and a wire connected to the levers $f$ and operating to raise the said bar when pulled upon, substantially as and for the purpose set forth.

3. In a railway signaling apparatus, the combination, with a short horizontal bar, of a stationary support, the weighted levers $m$ normally holding the said bar in its raised position, the weighted levers $o$ and $o^2$ operatively connected together and to one of the levers $m$, and a wire connected to the lever $o$ and operating to depress the said bar when pulled upon, substantially as set forth.

4. In a railway signaling apparatus, the combination, with the normally depressed bar $e$, and the normally raised bars $p$ arranged in front of the bar $e$, of a pivoted operating lever, two wires connected to the said lever on opposite sides of its pivot, and intermediate lever mechanisms connecting the said wires with the said bars, the said lever operating to raise the bar $e$ and depress the bars $p$ simultaneously, and the bars $p$ being individually depressible without affecting the bar $e$, substantially as and for the purpose set forth.

5. In railway signaling apparatus, the combination, with the lever $t$ for operating an audible signal on an engine, of the spring-pressed slide connected to the lever $t$, the pivoted lever $r$ for operating the said slide, trip mechanism for operating the lever $r$, and a disengaging lever $u$ interposed between the lever $r$ and the slide and permitting the said slide to be placed out of gear with the said trip mechanism, substantially as set forth.

In testimony whereof I affix my signature in presence of two witnesses.

ARTHUR GREGORY.

Witnesses:
  FREDK. GEO. CASSELL,
    22 *Glasshouse St.*, *London*.
  CHAS. W. M. LESON,
    16 *Grafton Rd.*, *London, N*.